June 2, 1936.  A. M. FELDMAN  2,042,773
BROILER
Filed Aug. 9, 1935
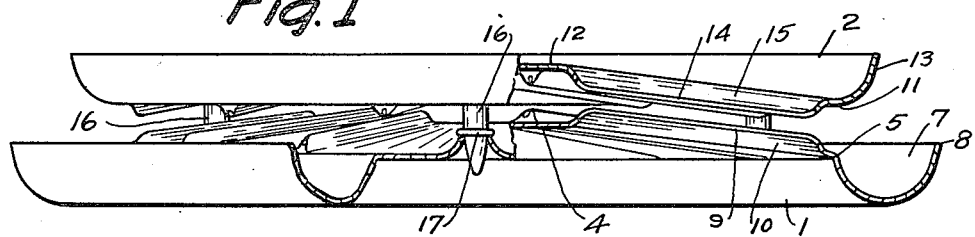
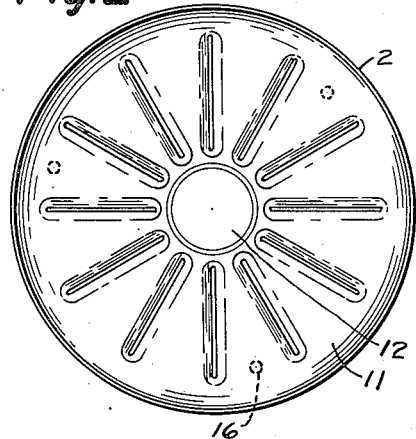
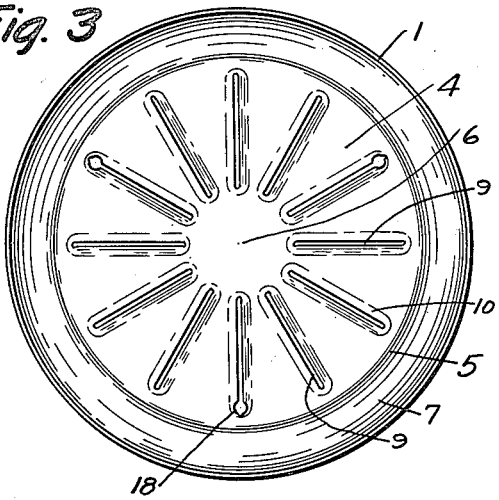
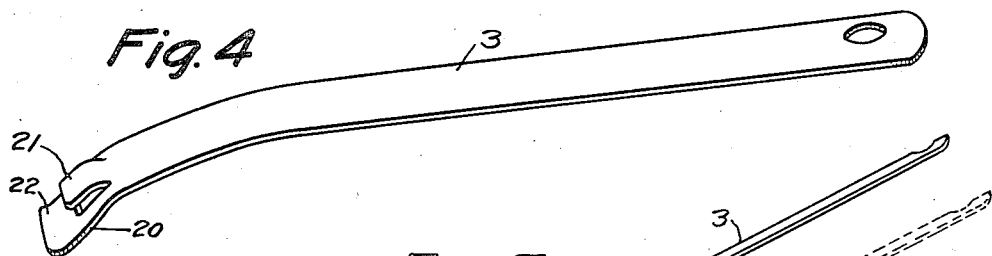
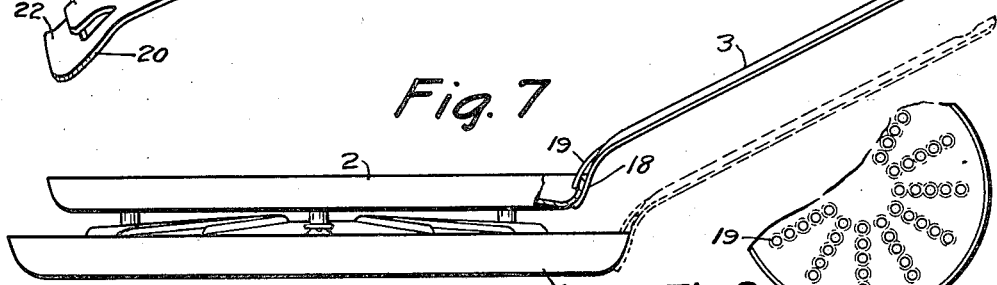
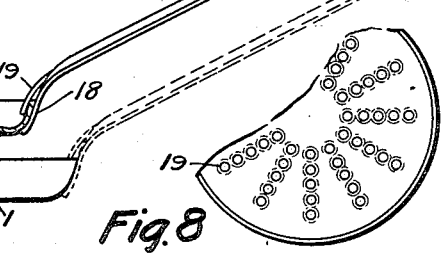
INVENTOR.
Albert M. Feldman
BY
James Harrison Bowen
ATTORNEY.

Patented June 2, 1936

2,042,773

UNITED STATES PATENT OFFICE 2,042,773

BROILER

Albert M. Feldman, New York, N. Y., assignor to Dewar Manufacturing Company, Brooklyn, N. Y.

Application August 9, 1935, Serial No. 35,413

14 Claims. (Cl. 53—5)

The purpose of this invention is to provide a broiler that may readily be placed over a gas, electric, or other burner which will hold a steak or the like above the burner, and which is provided with means for catching the drip so that the juices do not drop upon or into the burner.

The invention is a broiler consisting of an upper plate superimposed above a lower plate, and having a detachable handle for lifting either plate, in which both plates are provided with radially extending openings, and with the openings of one plate staggered in relation to those of the other.

Many types of hot plates and other devices have been provided for frying or cooking over a horizontal burner, and many of these have been provided with staggered grooves or openings, and some have been provided with peripheral recesses to catch the drip, however it is desirable to provide a simple device which may be stamped of sheet metal, and in which flanges stamped from radially extending openings of the upper plate extend downwardly and permit the juices to drop downward, through the openings, whereas the flanges stamped from openings of the lower plate extend upwardly and prevent the juices dropping downward through the openings so that the maximum amount of heat may be transmitted upward through openings in the devices without permitting the juices to drop upon the burner.

The object of the invention is, therefore, to arrange the parts of a broiler of this type so that the juices will drop away from the center and be radially conveyed to a trough at the outer edge without being permitted to drop into the burner.

Another object is to provide a simple and efficient broiler consisting of an upper plate and a lower plate, each of which may be removed and cleaned independently.

Another object is to provide a broiler of the type having an upper and lower plate with the upper plate superimposed above the lower, in which both may be stamped of sheet metal.

A further object is to provide a broiler having the broiling pan superimposed above a lower pan in which a handle is provided which will grip and raise either pan.

And a still further object is to provide a broiler having one pan superimposed above another, and also a removable handle in combination which is of a simple and economical construction.

With these ends in view the invention embodies a broiler comprising a lower circular pan with the central part bulged upward and having a circumferential trough extending continuously around the periphery thereof, and in which slots are provided in the surface of the central part with the edges thereof sloping upward preventing juices dropping through said slots; and another pan having radially extending slots and a circumferential flange at the outer edge, and also with the central part bulging upward, in which the slots are provided with depending flanges permitting juices to drop downward upon the surface of the lower pan. A handle may be provided in combination with this device which is adaptable to raise either pan.

Other features and advantages of the invention will appear from the following description, taken in connection with the drawing, wherein:

Figure 1 is a view showing a side elevation of the device with parts of both pans broken away and with one of the slots in the upper pan shown over one of the slots in the lower pan for the purpose of illustrating, whereas it is understood that these slots are staggered.

Figure 2 is a plan view of the upper pan.

Figure 3 is a plan view of the lower pan.

Figure 4 is a detail showing the handle.

Figure 5 is a section through one of the slots in the upper pan.

Figure 6 is a similar section through one of the slots of the lower pan.

Figure 7 is a view similar to that shown in Figure 1 showing the handle in combination with the handle in full lines on the upper pan, and in dotted lines on the lower pan.

Figure 8 is a view showing an alternate arrangement in which perforations are provided in the plates instead of the slots.

In the drawing the device is shown as it may be made wherein numeral 1 indicates the lower pan, numeral 2 the upper pan, and numeral 3 the handle.

The lower pan 1 may be made as shown with a curved plate 4 forming the central portion which extends upward from the point 5 to a point 6 in the center, and the periphery is provided with a continuous trough 7, the outer edge of which extends upward to the point 8 which is slightly above the point 5. A plurality of radially extending slots, perforations, vents, or openings 9 are located in the surface of the central portion 4, and these are formed as shown in Figure 6, and provided with upwardly inclined flanges 10, with openings between the flanges permitting heat to pass upward therethrough. These openings are formed as shown in Figures 3 and 6, however it will be understood that they may be also formed as shown in Figure 8, of any shape or arranged in any manner. The upper pan 2 is also formed with a round plate which extends upward from the point 11 to the point 12 at the center, and this is provided with an upwardly extending flange 13 which extends continuously around the periphery thereof. The central portion of this plate is also provided with radially extending openings which are indicated by the numeral 14, and these are formed as shown in Figure 5 in which flanges 15 at the sides thereof are inclined inward and downward so that juices dropping on the pan will run down over the flanges and drop through the openings 14 upon the surface of the central portion 4 of the pan 1. These openings are staggered in relation to the openings 9 in the member 1 so that these juices will not drop through the slots 9, but will run down the surface of the member 1 and pass into the trough 7. The member 2 is provided with three legs 16 having ridges or shoulders 17 and points at their lower ends which extend through openings 18 in the ends of the slots 9, as shown in Figure 1. These legs support the member 2 at a certain distance above the member 1 providing a heat retaining area between the two plates. It will be understood, however, that the upper plate may be supported above the lower in any manner or by any means, and the openings may be in the form of slots as shown in Figures 1 to 3, or perforations 19, as shown in Figure 8, or of any shape and may be arranged in any manner.

The device may be provided with a handle 3 which is formed with a flat bar with a downwardly extending end 20 and a clip 21 is stamped out of the end of the handle and extends downward substantially parallel to the part 20 and the lower end of the part 20 is slightly curved, as shown at the point 22. These parts are so shaped that the part 21 may be placed inside of the flange of either of the pans 1 or 2 with the part 20 on the outside, and with the lip 22 extending under the lower edge, as shown in Figure 7, and it will be noted that with the handle arranged in this manner either pan may readily be lifted and removed or replaced. It will be appreciated, however, that any other means may be used for lifting the pans.

It will be understood that other changes may be made in the construction without departing from the spirit of the invention. One of which changes may be in the use of other means for forming the slots in these members, another may be in the use of pans of a different shape, and still another may be in the use of handles of any other type and the handle, or handles, may be directly attached to the pans if desired.

The construction will be readily understood from the foregoing description. In use the device may be provided as shown and described, and it will be noted that with the pan 1 placed over a burner the pan 2 may be placed thereon by inserting the points of the legs 16 in the openings 18 and then a steak, fish, chops, or other products may be placed on the pan 2, and these may be broiled with the juices thereof dropping down through the slots 14 on the surface 4 and passing into the trough 7, and with the heat from the burner passing upward through the slots 9 and against the lower side of the central portion of the member 2, thereby obtaining the greatest possible efficiency.

It will be noted that both of these pans are formed so that they may be stamped from sheet metal with dies in substantially one operation so that the entire device may be provided at a comparatively low cost, thereby making it possible to place the device on the market for approximately fifty cents, whereas any similar device retails at four or five times this amount.

Having thus fully described the invention, what I claim as new, and desire to secure by Letters Patent, is:

1. A broiler comprising an upper and a lower pan and a detachable handle, said upper pan having radially extending drain vents with downwardly extending flanges, and said lower pan also having radially extending drain vents with upwardly extending flanges, said lower pan having a continuous circumferential trough.

2. A broiler as described in claim 1 in which the surfaces of said upper and lower pans are raised toward the center.

3. A broiler as described in claim 1 in which the surfaces of said upper and lower pans are raised toward the center and the upper pan is supported from the lower by supports having tips extending into the vents of the lower pan.

4. A broiler as described in claim 1 in which the surfaces of said pans slope downward from the center, and the surface of the lower pan slopes at a greater angle than that of the upper pan.

5. A broiler as described in claim 1 in which the upwardly and downwardly extending flanges of the respective pans slope at a relatively small angle from the surface of the pan toward the vents.

6. A device as described in claim 1 in which the vents of one pan are staggered in relation to those of the other.

7. The combination with a circular pan having a raised central portion with radial openings therein and a continuous circumferential trough around the periphery thereof; of a second circular pan superimposed above said former pan, and also having a raised central portion with radial openings therein and means supporting said second pan above said first pan.

8. A device as described in claim 7 in which the edges of the openings in the lower pan slope upward.

9. A device as described in claim 7 in which the edges of the openings of the second pan slope downward.

10. A device as described in claim 7 in which the edges of the openings in the lower pan slope upward, and the edges of the openings in the upper pan slope downward, and in which the upper pan is provided with a continuous flange around the periphery thereof.

11. A broiler comprising an upper and a lower pan and a detachable handle, said upper pan having radial slots with downwardly extending flanges, and said lower pan also having radial slots with upwardly extending flanges, said lower pan having a continuous circumferential trough.

12. A device as described in claim 11, having means spacing the upper pan above the lower.

13. A device as described in claim 11, having means spacing the upper pan above the lower and in which the slots of one pan are staggered in relation to those of the others.

14. A broiler comprising a lower pan, an upper pan superimposed above the lower pan, and means spacing the upper pan from the lower, said lower pan having perforations with the edges thereof curved upward, and said upper pan having perforations with the edges thereof curved downward, said perforations of the upper pan staggered in relation to those of the lower pan.

ALBERT M. FELDMAN.